United States Patent [19]
Yamakawa et al.

[11] Patent Number: 5,382,965
[45] Date of Patent: Jan. 17, 1995

[54] WAX TRANSFER TYPE THERMAL PRINTING METHOD AND THERMAL PRINTER

[75] Inventors: Kenji Yamakawa; Hitoshi Saito; Masamichi Sato, all of Tokyo, Japan

[73] Assignee: Fuji Photo Film Co., Ltd., Kanagawa, Japan

[21] Appl. No.: 986,076

[22] Filed: Dec. 4, 1992

[30] Foreign Application Priority Data

Dec. 4, 1991 [JP] Japan .................. 3-320522

[51] Int. Cl.[6] ............................ B41J 2/325
[52] U.S. Cl. ..................... 346/76 PH; 358/298
[58] Field of Search ............. 346/76 PH, 1.1; 358/298; 400/120

[56] References Cited

U.S. PATENT DOCUMENTS 4,724,446  2/1988  Hirahara et al. ............... 346/76 PH
5,099,259  3/1992  Hirahara et al. ............... 346/76 PH

FOREIGN PATENT DOCUMENTS 3219969  9/1991  Japan .

Primary Examiner—Benjamin R. Fuller
Assistant Examiner—Huan Tran

[57] ABSTRACT

A wax transfer type thermal printer includes a thermal head having a plurality of heating elements arranged in the main scanning direction. Each heating element transfers an ink dot in a unit pixel. The length of each ink dot is changed in accordance with gradation levels. In printing characters, a unit pixel is used as one pixel. In printing a half-tone image, the heating elements are divided into plural groups each of which has N heating elements and records (N×M) unit pixels as one pixel, where M, N are integers of 2 or more.

10 Claims, 2 Drawing Sheets

WAX TRANSFER TYPE THERMAL PRINTING METHOD AND THERMAL PRINTER

BACKGROUND OF THE INVENTION

1. Field of the Invention

The present invention relates to a wax transfer type thermal printing method and a thermal printer, and more particularly to a method and a printer suitable for printing a composite image including characters and a half-tone image.

2. Related Art

In a wax transfer type thermal printing method, a back surface of an ink film is heated with a thermal head, and melted or softened ink is transferred to a receiving paper. Because the amount of ink to be transferred to the receiving paper cannot be adjusted in accordance with heat energy, this method has been used to print bimodal images such as a line drawing or characters. Japanese Patent Laid-open Publication No. 3-219969 discloses an improved wax transfer type thermal printing method capable of printing a half-tone image having a high gradation by using a plurality of heating elements or resistive elements which are long in a main scanning direction and narrow in a sub scanning direction perpendicular to the main scanning direction. Thereby, the length of a recorded ink dot in the sub scanning direction may be changed by control of the time of current supply, the amount of current or the number of drive pulses for the heating elements.

Characters, half-tone images and composite images including a half-tone image and characters as printing images may be used for thermal printing. Generally, because high resolution is required to print characters, it is necessary to determine a pixel density for characters to be 12 dots/mm or more. In this case, the size of a pixel is $84 \times 84$ $\mu$m or smaller. On the other hand, a pixel density of 6 dots/mm is sufficient to reproduce most half-tone images. Accordingly, a thermal head with a different pixel density is used for a wax transfer type thermal printer for characters and a wax transfer type thermal printer for half-tone images.

However, in a wax transfer type thermal printer for both characters and half-tone images, a thermal head of 12 dots/mm or more in the pixel density is used so as to adapt to the pixel density for characters for recording an ink dot in each pixel of e.g., $84 \times 84$ $\mu$m or smaller. In this cased the following problems occur because the size of pixels is too small to print half-tone images at this pixel density. First, ink dots cannot be transferred uniformly at low density areas because of irregularities of a receiving material such as plain paper so that the density of the areas will not be even. Second, when the length of heating elements in the sub scan direction is made constant for both characters and half-tone images, a sufficient number of gradations for half-tone images cannot be obtained. Third, the occurrence of fogging would increase.

SUMMARY OF THE INVENTION

It is an object of the present invention to provide a wax transfer type thermal printing method and a thermal printer by which both characters and a half-tone image can be printed in high quality.

In order to achieve the above and other objects of the present invention, small size pixels are used for printing characters while large size pixels are used for printing a half-tone image. In a preferred embodiment, one heating element is used to print an ink dot in a unit pixel for characters, whereas adjacent N heating elements are made for one group to print an ink dot in a pixel composed of ($N \times M$) unit pixels, where M, N are integers of 2 or more.

According to the present invention, the characters are printed at a high pixel density while the half-tone image is printed at a low pixel density, so that the characters can be printed sharply and the half-tone image can be printed with a sufficient number of gradations. Furthermore, because ink transfer can be performed uniformly in printing the half-tone image, it is possible to reproduce low density areas of the half-tone image smoothly and to reduce fogging.

BRIEF DESCRIPTION OF THE DRAWINGS

The above and other objects and advantages of this invention will become apparent to the person skilled in the art from the following detailed description of the invention when read in connection with the accompanying drawings, in which.

DETAILED DESCRIPTION OF THE PREFERRED EMBODIMENTS

Figure 1:
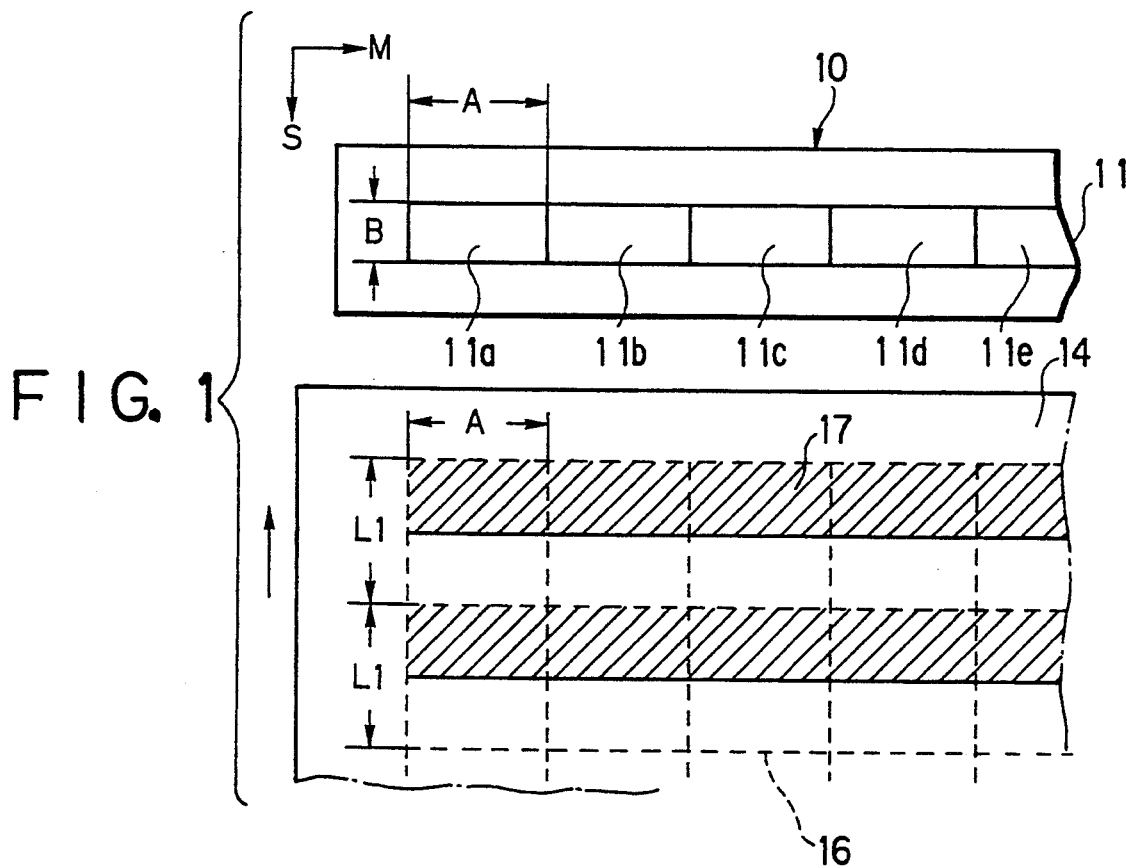
FIG. 1 is an explanatory view illustrating the printed condition of characters for an embodiment of the present invention.

In FIG. 1, a thermal head 10 is provided with a heating element array 11 extending in the main scanning direction M. The heating element array 11 includes a plurality of heating elements 11a, 11b, 11c . . . Each heating element is in the shape of a rectangular having respective lengths A and B in the main and sub scanning directions. For example, the length A is 84 $\mu$m and the length B is 40 $\mu$m.

The thermal head 10 and a receiving paper 14 perform continuous or intermittent relative motions in the sub scanning direction. An ink film 15 (see FIG. 3) is brought into contact with the receiving paper 14. The back surface of the ink film 15 is heated by the thermal head 10 to cause its ink to be melted or softened. The melted or softened ink is transferred to pixels 16 for characters to form ink dots 17 as indicated by hatching. The pixels 16 for characters, which are surrounded by broken lines, are in the shape of a square having respective lengths A and L1 in the main and sub scanning directions. The length A is determined in accordance with the size of the heating elements while the length L1 can be arbitrarily determined by an electric signal.

In this embodiment, each of lengths A and L1 is 84 $\mu$m and each of the pixel densities in the main and sub scanning directions is 12 dots/mm. An advancing pitch of the thermal head 10 is 4 $\mu$m, and the ink dots 17 are increased stepwise by 4 $\mu$m after exceeding 40 $\mu$m. Therefore, the number of gradations is 11 as calculated by the following equation:

$$(84-40)/4 = 11.$$

Figure 2:
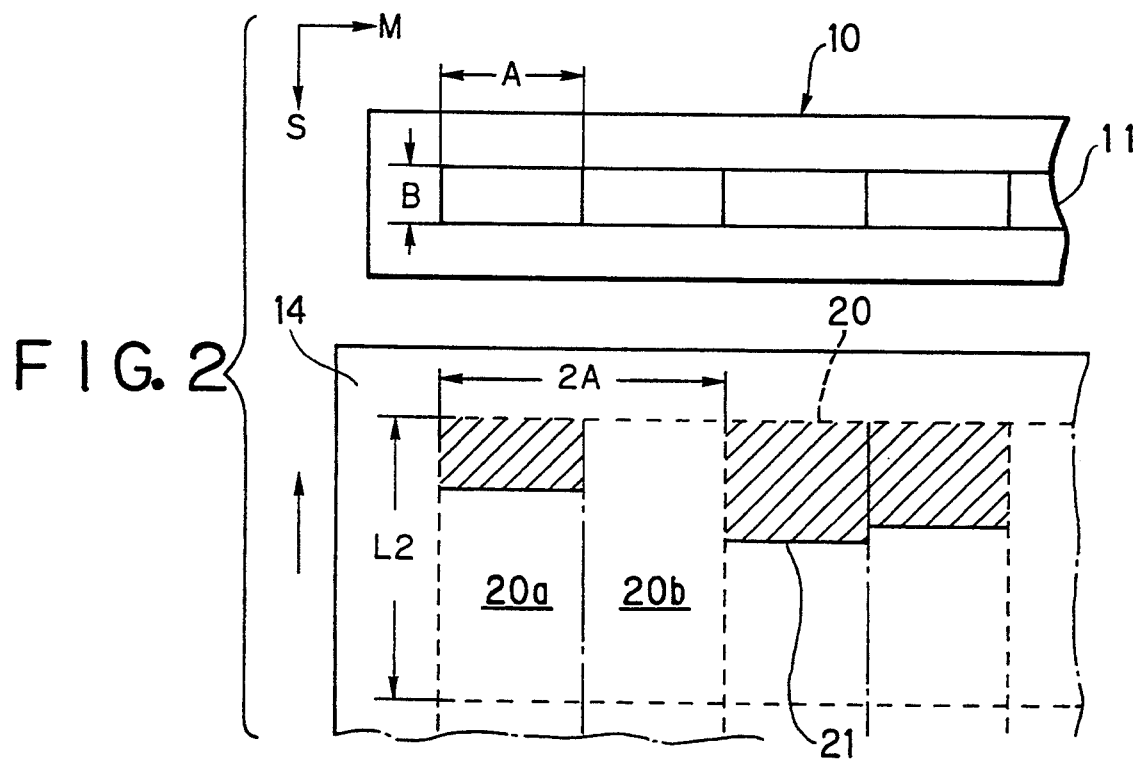
FIG. 2 is an explanatory view illustrating the printed condition of a half-tone image for an embodiment of the present invention.

FIG. 2 illustrates the printing condition of a half-tone image. The size of pixels 20 for half-tone images is larger than that of the pixels 16 for characters in order to obtain a sufficient number of gradations. In this embodiment, each of the pixels 20 for half-tone images is 2A×L2 in size and consists of two cells 20a, 20b. For example, each of the lengths 2A and L2 is 168 μm. In this case, the size of the pixels 20 for half-tone images is four times as large as that of the pixels 16 for characters. Each of the pixel densities in the main and sub scanning directions is 6 dots/mm. An ink dot may be recorded in one pixel by three or four heating elements.

When printing a half-tone image, at the gradation level 1, a minimum ink dot is recorded only in the cell 20a up to a length of 40 μm in the sub scanning direction. At the gradation level 2, 4 μm is increased and the length of the ink dot is 44 μm. Similarly, the area where the ink dot is recorded is increased by 4 μm and then the ink dot is recorded up to 76 μm at the gradation level 10. At the gradation level 11, the ink dot is recorded in the cell 20b up to 40 μm in addition to the amount to be recorded at the gradation level 10. At the gradation level 12 or more, the ink dot is increased by 4 μm per level alternately in the cell 20a or 20b. At the gradation level 64, the ink dot is recorded in the entirety of cells 20a, 20b.

Since ink dots 21 and white portions are scattered according to this printing method, the quality of resolution is increased. The length L2 is 168 μm, so that the number of gradations is 64 as calculated by the following equation:

$$(168-40)\times 2/4 = 64.$$

Figure 3:
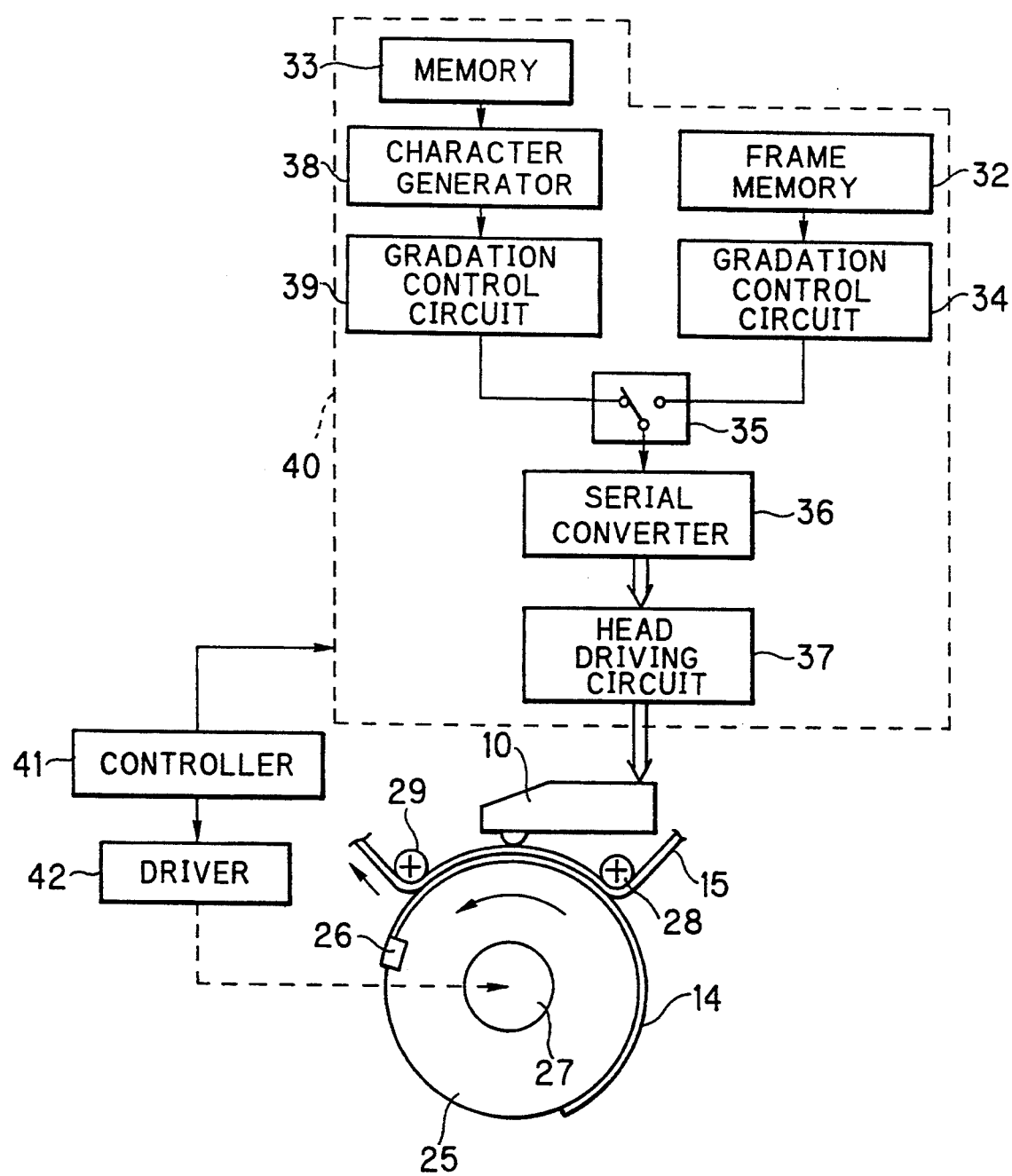
FIG. 3 is a block diagram illustrating a wax transfer type thermal printer according to an embodiment of the present invention.

In FIG. 3 which illustrates a wax transfer type thermal printer, the receiving paper 14 is wound on a platen drum 25 with its one end fixed by a clamp member 26. The platen drum 25 is rotated intermittently at a constant pitch (4 μm) by a pulse motor 27. The ink film 15 is moved along guide rollers 28 and 29 so that the receiving paper 14 is in tight contact with the ink film 15. The thermal head 10 is disposed between the guide rollers 28 and 29 to heat the ink film 15 from the back surface.

Image data of a half-tone image are written in a frame memory 32 and codes of characters are written in a memory 33. At the time of printing the half-tone image, the image data are read from the frame memory 32 line by line and sent to a gradation control circuit 34. Because one pixel is recorded by two heating elements in this embodiment, the gradation control circuit 34 converts image data for one pixel into two rows of drive data. Each row consists of 36 bits to record 32 sub-lines.

The drive data for pixels of a line are read from the gradation control circuit 34 sub-line by sub-line and supplied to a serial converter 36. The drive data are converted by the serial converter 36 into parallel drive data, which are then sent to a head driving circuit 37. The head driving circuit 37 drives each heating element to heat the ink film 15, which causes an ink dot to be transferred to each cell.

At the time of printing characters, the character codes are read line by line from the memory 33 and sent to a character generator 38, where each character code is converted into a character pattern having N1×N2 pixels (e.g. 30×30). Data of the character patterns are read line by line in the main scan direction and sent to a gradation control circuit 39. One pixel for characters consists of 11 sub-lines, so that the gradation control circuit 39 converts the supplied data of each pixel into drive data consisting of 11 bits. The drive data are read sub-line by sub-line and sent to the serial converter 36. The portion surrounded by broken lines is a signal processor which is controlled by a controller 41. A reference numeral 42 indicates a driver.

In thermal printing, the controller 41 drives the pulse motor 27 via the driver 42 so as to rotate the platen drum 25 intermittently at a constant pitch. The ink film 15 is fed in a direction as indicated by an arrow in tight contact with the receiving paper 14. For printing only characters, the memory 33 is used in which there are written character codes having been inputted via a keyboard or the like. When a print starting position of the receiving paper 14 reaches the thermal head 10, the character codes are read from the memory 33 and converted into pixel data in the character generator 38. The pixel data are then converted into drive data in the gradation control circuit 39. The drive data are sent via the selector 35, the serial converter 36 and the head driving circuit 37 to the thermal head 10, where the respective heating elements are selectively driven to record the ink dots 17 in the pixels 16 for characters, as illustrated in FIG. 1.

For printing a half-tone image, the frame memory 32 is used in which there are written image data having been inputted by a scanner or an electric still video camera. The image data are read one line after another and converted into driven data in the gradation control circuit 34. The drive data are sent to the thermal head 10, where the respective heating elements are selectively driven to record the ink dots 21 in the pixels 20 for half-tone images, as illustrated in FIG. 2.

For printing a composite image of characters and a half-tone image, character codes are written in the memory 33, and image data of the half-tone image are written in the frame memory 32. First, the character codes are read from the memory 33 to print the characters on the receiving paper 14 while the platen drum 25 makes one rotation. Next, the image data are read from the frame memory 32 to print the half-tone image on the receiving paper 14 while the platen drum 25 makes another one rotation.

The present invention is embodied by use with the line printer but is adaptable to a serial printer and a color printer whose ink film has cyan, magenta and yellow ink areas. In the above embodiment, the length of the heating elements in the sub scanning direction is shorter than that in the main scanning direction, but may be longer than that in the main scanning direction so as to print each one pixel for the characters by one time heating. In that case, it is advantageous in shortening the speed for printing the characters. For printing the half-tone image, each one pixel for the half-tone image includes a plurality of sub-lines and the length of an ink dot in each pixel in the sub scanning direction is changed by several times of heating in accordance with the gradation levels.

Various changes and modifications to be illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A wax transfer type thermal printing method for printing characters and a half-tone image on a receiving paper, comprising the steps of:

(a) selecting between a first predetermined size of pixels and a second predetermined size of pixels, where said second predetermined size of pixels is larger than said first predetermined size of pixels, in accordance with contents to be printed, said first predetermined size of pixels being used when the contents to be printed comprise the characters and said second predetermined size of pixels being used when the contents to be printed comprise the half-tone image; and (b) recording an ink dot in each of the selected pixels at said step (a) by transferring ink of an ink film to the receiving paper by heating said ink film with a thermal head having a plurality of heating elements arranged in a main scanning direction such that a length of said ink dot of each of the selected pixels in a sub scanning direction perpendicular to said main scanning direction is changed in accordance with gradation levels.

2. A wax transfer type thermal printing method as defined in claim 1, wherein a width of said first predetermined size of pixels in said main scanning direction is approximately equal to a width of said heating elements in said main scanning direction, and a width of said second predetermined size of pixels in said main scanning direction is approximately equal to a width of at least two of said heating elements of said heating elements in said main scanning direction.

3. A wax transfer type thermal printing method as defined in claim 2, wherein a length of said first predetermined size of pixels and a length of said second predetermined size of pixels are determined by a time period in which said heating elements are energized and said length of said second predetermined size of pixels is larger than the length of said first predetermined size of pixels.

4. A wax transfer type thermal printing method as defined in claim 3, wherein said step (c) comprises recording pixels by one of said heating elements as unit pixel with each of said first predetermined size of pixels being said unit pixels and each of said second predetermined size of pixels being N×M pixels wherein N, which is an integer of 2 or more, is a number of said unit pixels in said main scanning direction and M, which is an integer of 2 or more, is a number of said unit pixels in said sub scanning direction.

5. A wax transfer type thermal printing method as defined in claim 1, wherein the receiving paper is held on a platen drum which is rotated intermittently by a pulse motor in said sub scanning direction.

6. A wax transfer type thermal printing method for printing characters and a half-tone image on a receiving paper, comprising the steps of:

(a) selecting between character pixels for recording the characters and half-tone pixels for recording the half-tone image, each of said character pixels being unit pixels and each of said half-tone pixels being N×M unit pixels wherein N, which is an integer of 2 or more, is a number of said unit pixels in a main scanning direction and M, which is an integer of 2 or more, is a number of said unit pixels in a sub scanning direction perpendicular to the main scanning direction; and (b) recording an ink dot in each of the selected pixels at said step (a) by transferring ink of an ink film to the receiving paper by heating said ink film with a thermal head having a plurality of heating elements arranged in a main scanning direction such that a length of said ink dot of each of the selected pixels in said sub scanning direction is changed in accordance with gradation levels.

7. A wax transfer type thermal printer for printing characters and a half-tone image by transferring ink of an ink film on a receiving paper, comprising:

a thermal head for heating a rear side of the ink film;

a plurality of heating elements arranged in said thermal head in a main scanning direction, each of said heating elements recording an ink dot from said ink film and a length of each of said ink dots in a sub scanning direction perpendicular to the main scanning direction is changed in accordance with gradation levels; and control means for selecting a size of a single pixel so as to record either the characters or the half-tone image, a unit pixel being used as said single pixel for the characters and N×M unit pixels being used as said single pixel for the half-tone image, wherein N, which is an integer of 2 or more, is a number of said unit pixels in said main scanning direction and M, which is an integer of 2 or more, is a number of said unit pixels in said sub scanning direction.

8. A wax transfer type thermal printer as defined in claim 7, further comprising:

a first memory for storing codes of the characters;

a second memory for storing image data of the half-tone image;

first converting means for converting said codes of the characters read from said first memory into character drive data;

second converting means for converting said image data read from said second memory into image drive data; and selecting means for reading between said character drive data and said image drive data and supplying the read drive data to said thermal head.

9. A wax transfer type thermal printer as defined in claim 7, further comprising a platen drum for holding the receiving paper and a pulse motor for intermittently rotating said platen drum in said sub scanning direction.

10. A wax transfer type thermal printer as defined in claim 9, wherein two rotations are made for said platen drum for printing either the characters or the half-tone image during each of said rotations when a composite image of the characters and the half-tone image is printed.

* * * * *